April 16, 1940.  G. H. HUNT  2,196,990
WHEEL CONSTRUCTION
Filed March 12, 1936  2 Sheets-Sheet 1
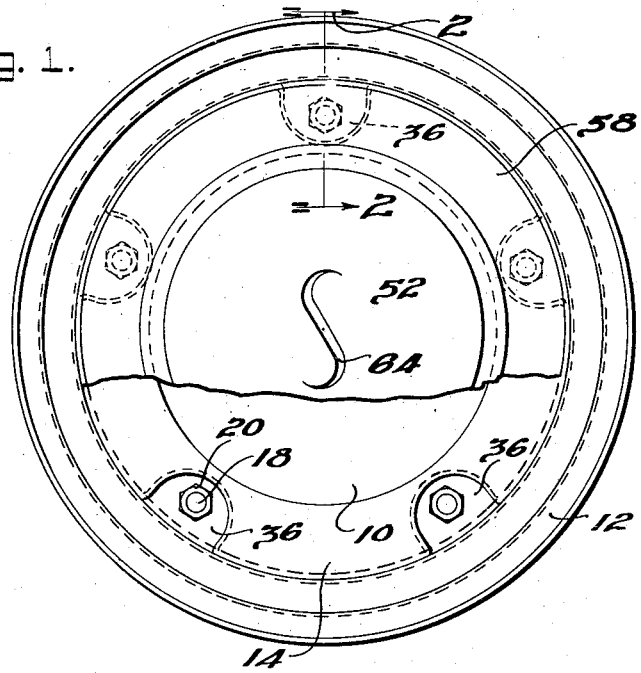
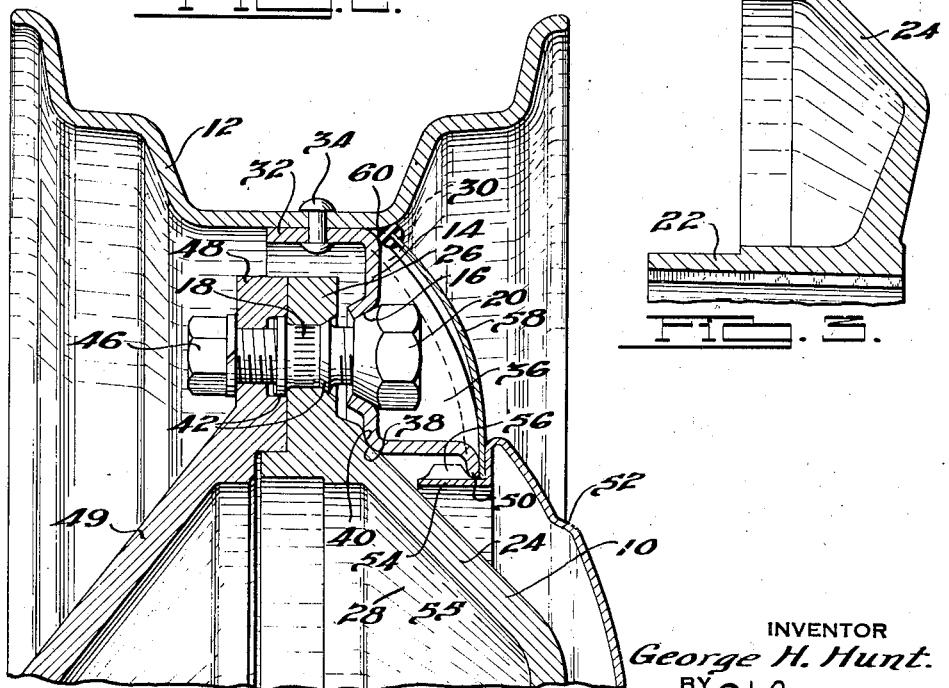
INVENTOR
George H. Hunt.
BY
ATTORNEY April 16, 1940.                G. H. HUNT                2,196,990
                            WHEEL CONSTRUCTION
                           Filed March 12, 1936            2 Sheets-Sheet 2

Inventor
George H. Hunt,
By
Attorneys

Patented Apr. 16, 1940

2,196,990

UNITED STATES PATENT OFFICE 2,196,990

WHEEL CONSTRUCTION

George H. Hunt, Detroit, Mich., assignor, by mesne assignments, to Detroit Hydrostatic Brake Corporation, a corporation of Michigan Application March 12, 1936, Serial No. 68,482

1 Claim. (Cl. 301—6)

This invention relates to wheel construction and particularly to improvements in wheel construction for motor vehicles.

A principal object of the invention is to provide a novel form of wheel construction which includes as a part thereof a braking surface whereby the weight of the wheel and brake assembly may be reduced.

Another object of the invention is to provide an improved form of wheel construction including a brake surface provided with means for dressing up the outside of the wheel, the wheel being so formed as to provide air circulation from one side to the other thereof and in heat exchange relationship with the outside of the braking surface.

Another object of the invention is to provide a wheel construction consisting of two integral parts, a rim portion which carries the tire, and a hub portion which supports the wheel and which is arranged to provide a braking surface.

For a better understanding of the invention, reference may be had to the following specification and the accompanying drawings, of which there are two sheets, and wherein:

Fig. 1 is an elevational view partially broken away and illustrating a vehicle wheel embodying the invention;

Fig. 2 is a sectional view taken in a plane on the line 2—2 of Fig. 1, looking in the direction of the arrows;

Fig. 3 is a sectional view of a portion of the wheel hub;

Figure 4:
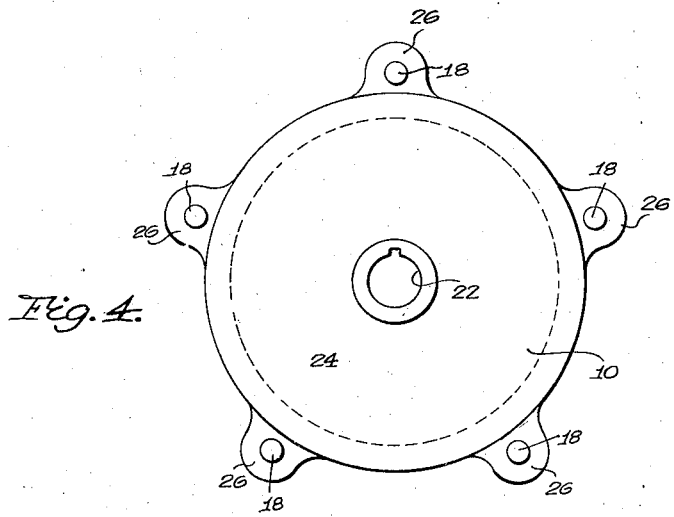
Fig. 4 is a front view of the hub and brake drum with the wheel removed therefrom to show the spaced ears.
Figure 5:
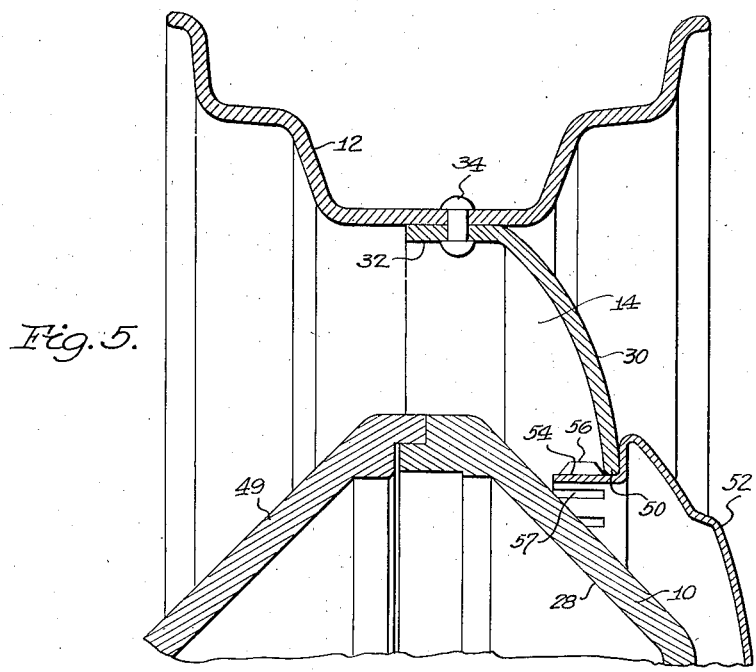
Fig. 5 is a sectional view similar to Fig. 2 but taken through the convex portion of the wheel between the bolts and with the ornamental shield out of position.

As illustrated, the wheel comprises a hub 10, a tire carrying rim 12, and an intermediate annular section 14 provided with a plurality of annularly spaced openings 16 each cooperable with a bolt 18 and a nut 20 by means of which various portions of the wheel are secured in operative relationship.

The hub 10 comprises a cylindrical central portion 22 which is adapted to support the wheel assembly, and a radially extending annular portion 24 which slopes outwardly and backwardly in the direction of the central portion 22, the periphery of the portion 24 being provided with a plurality of circumferentially spaced ears 26 which are provided with openings in which the bolts 18 are secured. There is thus formed between the cylindrical central portion 22 of the hub and the radially extending portion 24 an annular space adapted to accommodate a braking mechanism, and a frusto-conically shaped surface 55 on the inside of the portion 24 is formed and finished to provide a braking surface 28.

The annular section 14 may be formed as a stamping and is provided with a radially extending connecting portion 30, a laterally extending flange 32 by means of which the section 14 may be integrally secured to the rim 12, such as by a series of rivets 34, and a plurality of pockets 36 in the wall portions of which the openings 16 are formed and which pockets provide spaces for accommodating the nuts 20. The annular section 14 is provided at the base of each of the pockets 36 with a corner or edge 38 which is adapted to be seated upon a seat 40 provided on the hub portion 10.

The bolts 18 are each secured within the openings in the ears 26 by means of a pair of shoulders 42 which engage opposite sides of the respective ear 26 and firmly secure the respective bolt 18 in position. Upon removal of the nuts 20 from engagement with the bolts 18, the rim 12 and annular section 14 integral therewith may be removed as a unit from the hub portion 10.

For enclosing the space within which the braking mechanism is disposed, and for providing an additional braking surface, if desired, there may be provided an annular frusto-conically shaped member 49, secured at its periphery to the hub 10 by means of nuts 46 which engage the threaded ends of the bolts 18 which extend through openings formed in ears 48 on the member 49.

The radially extending portion 30 of the section 14 is curved and terminates at the inside thereof to provide a circular edge 50 which is spaced from the adjacent portion of the hub 10, thus affording an opening between one side of the wheel and the other whereby air may circulate between the hub 10 and the annular section 14 and pass from one side of the wheel to the other. For dressing up the exterior of the wheel, a hub cap 52, provided with a laterally extending flange 54, may be disposed externally of the hub portion 10 for concealing the same and within the space enclosed by the section 14, the flange 54 extending past the edge 50 of the section 14, and a plurality of spring clips 56 being provided on one side of the flange for engaging with the shoulder 50 for securing the hub cap 52 in position. If desired, suitable openings 57 may be provided in the flange 54 of the hub cap to permit the passage of a greater amount of air through the wheel. It will be observed that the hub cap thus is carried by the section 14 and the rim 12 of the wheel.

Between the hub cap 52 and the inside of the rim 12, there may be provided, if desired, an annular shield 58 for covering the section 14 and the nuts 20, one edge of the shield 58 being provided with a gasket 60 for frictionally engaging the section 14 and the rim 12, and the other edge of the shield 58 being secured between the edge 50 of the section 14 and a projecting edge of the hub cap 52. The shield 58 is provided solely for ornamentation and hence may be omitted. In case the shield 58 is omitted, the rim 12 and section 14 may be removed from the hub 10 without removing the hub cap 52 from said rim and said section, as the hub cap 52 is carried by the rim section 14. The hub cap 52 may be provided with a central opening 64 for admitting air to the space between the exterior of the hub 10 and the cap 52. During rotation of the wheel, the wheel will act like a blower and draw air into the opening 64 in the hub cap and discharge the same on the inside of the wheel between the rim 12 and the member 14. Thus, air will be circulated in heat exchange relationship with the exterior of the braking surface 28 and between the same and the tire carrying rim 12 for carrying away the heat energy due to braking, and will also tend to prevent the transmission of such heat energy to the rim 12 and the tire carried thereby.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claim.

I claim:

A wheel assembly comprising, a hub having integral therewith a braking surface and being formed at the periphery thereof with a series of spaced, radially extending portions, a tire carrying rim, a connecting member secured to said rim and detachably connectible with and in spaced relation to said portions on said hub, connecting means for securing said member to said portions in spaced relation thereto, a hub cap arranged for concealing said hub, said connecting member being in contact with said hub radially inwardly of said portions but spaced from said hub along the distances between said portions, and a central opening in said hub cap through which air may pass in heat exchange relationship with said braking surface by passing between said hub and said connecting member and thence between said rim and said radially extending portions of said hub through the spaces therebetween to the other side of the wheel assembly.

GEORGE H. HUNT.